US006985269B1

(12) United States Patent
Takeuchi

(10) Patent No.: US 6,985,269 B1
(45) Date of Patent: Jan. 10, 2006

(54) IMAGE READING APPARATUS

(75) Inventor: Yukitoshi Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 09/659,841

(22) Filed: Sep. 11, 2000

(30) Foreign Application Priority Data

Sep. 14, 1999 (JP) ................................ 11-260587

(51) Int. Cl.
*H04N 1/04* (2006.01)

(52) U.S. Cl. ................. 358/497; 358/474; 400/120.01; 250/234

(58) Field of Classification Search ................ 358/497, 358/474, 471, 400, 483; 400/283, 335, 120.01; 399/211, 202, 212; 250/234, 208.1
See application file for complete search history.

(56) References Cited

U.S. PATENT DOCUMENTS 5,285,294 A 2/1994 Takeuchi .................... 358/474
5,311,015 A * 5/1994 Takeuchi .................... 250/234
6,005,685 A * 12/1999 Tsai ........................... 358/497
6,026,261 A * 2/2000 Peng .......................... 399/211
6,108,108 A * 8/2000 Peng .......................... 358/497
6,246,492 B1 * 6/2001 Chang et al. ............... 358/497
6,464,416 B1 * 10/2002 Aoshima ............... 400/120.01

* cited by examiner

*Primary Examiner*—Edward Coles
*Assistant Examiner*—Heather D. Gibbs
(74) *Attorney, Agent, or Firm*—Fitzpatrick, Cella, Harper & Scinto

(57) ABSTRACT

An image reading apparatus comprises an original mounting table, a scanning means for scanning an original mounted on the original mounting table, a carriage for mounting the scanning means thereon, a cable for transmitting a moving force to the carriage, and a guide member for guiding the carriage in the movement direction thereof. The carriage is biased in a rotating direction centering about an axis perpendicular to the original mounting table by the tension of the cable.

5 Claims, 7 Drawing Sheets

IMAGE READING APPARATUS

BACKGROUND OF THE INVENTION

1. Field of the Invention

This invention relates to an image reading apparatus for computer input, which reads an original such as a photograph or a document, converts it into digital data and outputs the digital data, and an image reading apparatus corresponding to the original reading portion of an analog copier.

2. Related Background Art

The construction of a color image reading apparatus according to the prior art is schematically shown in FIGS. 5A to 5C of the accompanying drawings.

The letter P designates an original to be read, which is placed on an original mounting glass table 100, and a reading unit 101 is scanned in parallel to the original mounting glass table 100 to thereby read an image on the original.

The reading unit 101, as schematically shown in FIG. 6 of the accompanying drawings, has incorporated therein LED's 101R, 101G and 101B of three colors which are light sources for irradiating the original, a rod lens array 101L for imaging the reflected light from the original on the light receiving element of an image sensor, and the image sensor 101S.

The light sources of three colors are successively changed over and turned on and the image sensor 101S reads the reflected light of each color from the original, to thereby effect color resolution reading.

The reading unit 101 is fixedly supported on a slider 102 slidable on a guide shaft 103 fixed to the main body of the apparatus. Also, a belt 104 for transmitting motive power from a motor 105 which is a scanning drive source is fixed on the slider 102.

By the forward and reverse rotations of the motor 105, the reading unit 101 can be reciprocally scanned within the range of the original mounting glass table 100.

The constituents of the image reading apparatus further include an electrical equipment portion 106 comprising a control board and a power source, besides what has been described above.

These constituents are disposed in a housing comprising a combination of an upper cover 112 for fixedly supporting the original mounting glass table 100 and a lower cover 113.

An original cover 111 for pressing the original against the original mounting glass table 100 is openably and closably mounted on the original mounting glass table 100.

FIG. 7 of the accompanying drawings is a read image data processing block diagram by this image reading apparatus. An image output signal read by the image sensor 101 in synchronism with the LED's turned on and off in succession is sent to an amplifier 121 and is amplified thereby, and thereafter is converted into a digital image signal by an A/D converter 122.

The A/D converter 122 divides the dynamic range of the image sensor (the reading output difference between the white portion and the black portion of original) into the bit number thereof, and allots the number of gradations in conformity with the brightness of the image on the original.

For example, when an A/D converter of resolving power of 8 bits is used, white to black can be discriminated into 256 gradation levels, and when an A/D converter of resolving power of 10 bits is used, white to black can be discriminated into 1,024 gradation levels. Accordingly, in an image reading apparatus using the A/D converter of 8 bits, 24 bits=about 16,700,000 colors can be discriminated in the color reading by light sources of three colors R, G and B, and in the case of 10 bits, 30 bits=about 1,074,000,000 colors can be discriminated.

There are several kinds of output forms of the image signal of the image reading apparatus, and depending on the use of an image read, an output form suited therefor can be selected.

When a writing is to be read and the content thereof is to be applied to OCR or when a monochromatic line drawing is to be read, a monochromatic binary image is suitable, and use is made of image data obtained by binarizing an image signal obtained with e.g. only G of the above-described light sources of R, G and B turned on, by a certain threshold value in an image processing circuit incorporated in a gate array 123.

When an image is to be read with a view to read an image such as a photograph and output it to a monochromatic printer, use is made of image data binarized by the use of halftone processing such as a dither method or an error diffusing method using the image signal also by the G light source. When the processing of a color image is to be effected, image data of multiple values (24 bits, etc.) are suitable.

The image signal passed via the image processing circuit is outputted to a computer 200 which is an apparatus such as a personal computer through an interface circuit 124.

In recent years, however, the image reading apparatus according to the prior art as described above has come to be often used in offices and homes with the spread of personal computers. Along therewith, it has been brought to the fore as an important item in the specification of products to make the installation area occupied on a desk and consumed electric power as small as possible.

The pending problem when downsizing the apparatus is that since the span between the bearings of the reading unit 101 in the sub-scanning direction is short, vibration sometimes occurs to the movement of the reading unit 101 due to the fitting backlash between the bearings and the guide shaft 103. An image reading apparatus connected to a computer needs have the function of interruption/resuming the operation thereof in the course reading in conformity with the processing situation of the computer, and for the image before and after the interruption/resumption to be smoothly connected, there must not be such vibration.

Also, a method of making consumed electric power small is to make the electric current supplied to the motor 105 small, and for that purpose, it is necessary to make the driving load of the motor 105 small.

SUMMARY OF THE INVENTION

The present invention has been made in view of the above-noted problem and an object thereof is to provide an image reading apparatus in which the movement of a carriage can be effected smoothly.

Another object of the present invention is to provide a compact image reading apparatus.

Still another object of the present invention to provide an image reading apparatus comprising:

- an original mounting table;
- a scanning means for scanning an original mounted on the original mounting table;
- a carriage for mounting the scanning means thereon;
- a cable for transmitting a moving force to the carriage; and
- a guide member for guiding the carriage in the movement direction thereof;

wherein the carriage is biased in a rotating direction centering about an axis perpendicular to the original mounting table by the tension of the cable.

Further objects of the present invention will become apparent from the following detailed description when read with reference to the accompanying drawings.

DESCRIPTION OF THE PREFERRED EMBODIMENTS

Figures 1A, 1B, 1C:
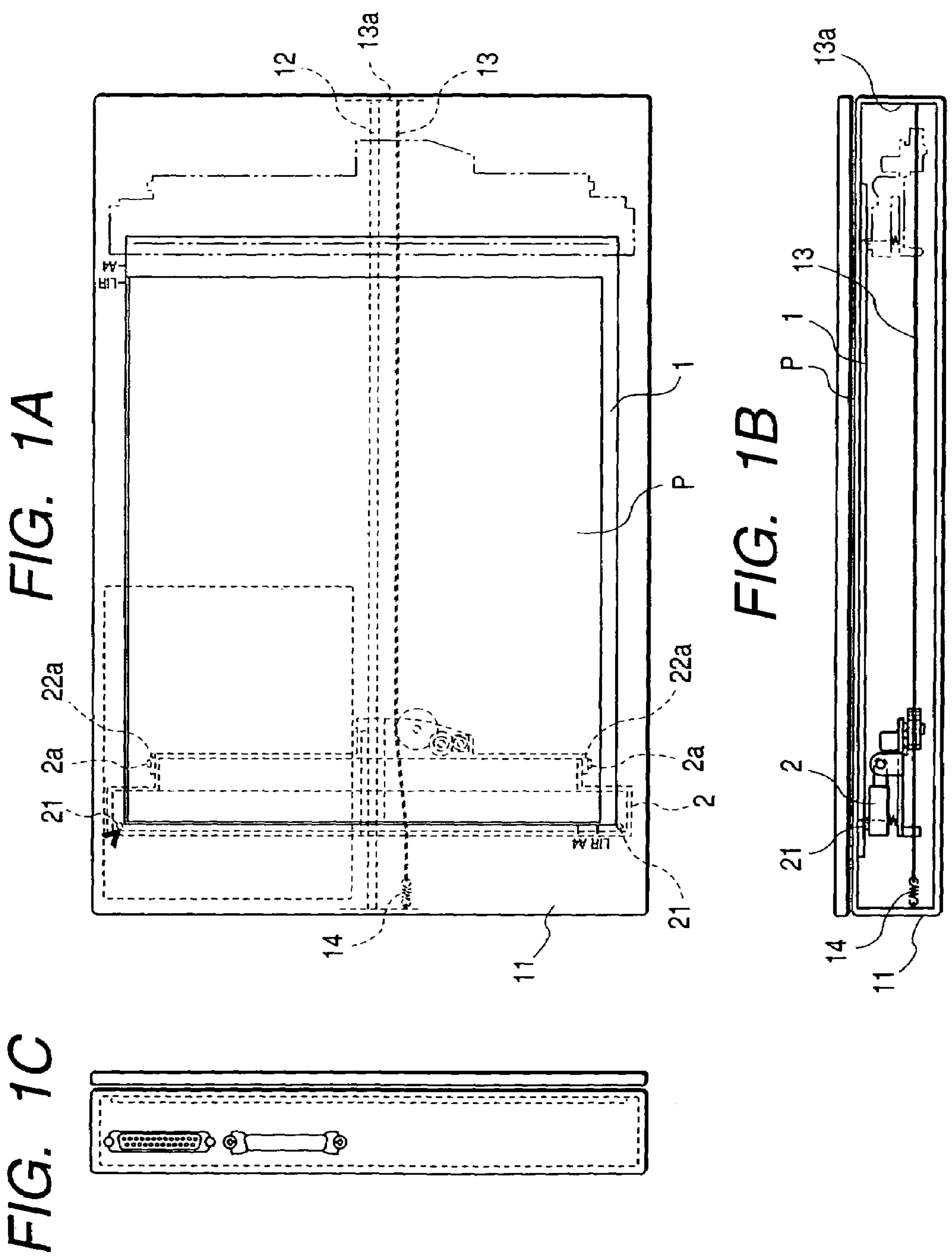
FIGS. 1A, 1B and 1C schematically show the construction of an image reading apparatus according to a first embodiment of the present invention.
Figure 2A:
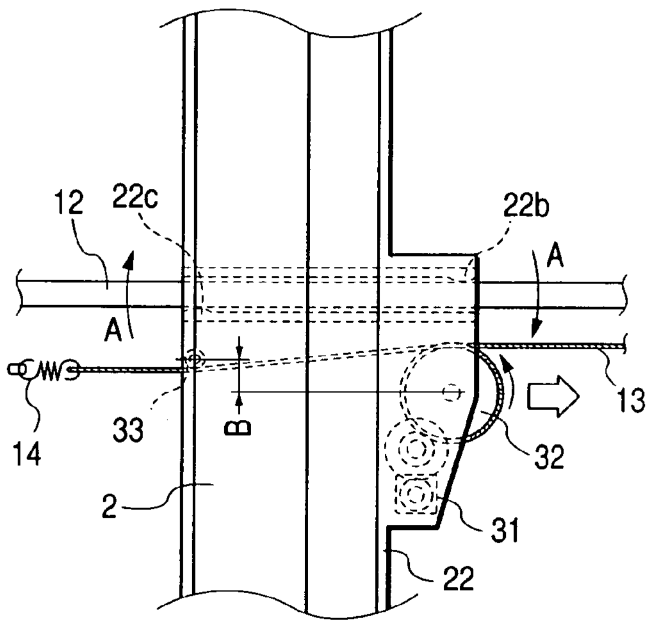
FIGS. 2A, 2B and 2C are enlarged views showing the image reading apparatus according to the first embodiment.
Figure 2B:
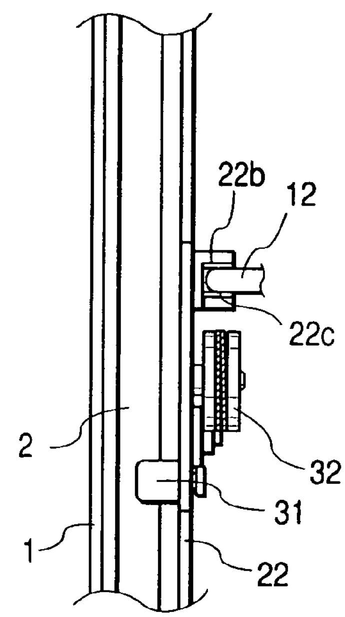
Figure 2C:
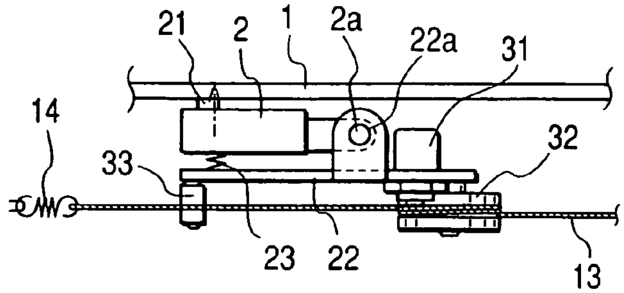

Some preferred embodiments of the present invention will hereinafter be described in detail by way of example with reference to the drawings. However, the dimensions, materials, shapes, relative disposition of constituent parts described in these embodiments, unless otherwise specifically described, are not intended to restrict the scope of this invention thereto.

First Embodiment

A first embodiment will hereinafter be described with reference to FIGS. 1A to 1C and FIGS. 2A to 2C. FIGS. 1A to 1C and FIGS. 2A to 2C show an example of the construction of an image reading apparatus according to the first embodiment.

The letter P designates an original to be read placed on an original mounting glass table 1, and a reading unit 2 as scanning means is scanned in parallel to the original mounting glass table 1 to thereby read an image on the original.

The reading unit 2 has incorporated therein a light source for irradiating the original, a lens for imaging the reflected light from the original on the light receiving element of an image sensor, and the image sensor.

The reference numeral 11 denotes a frame serving also as an outer package cover and having disposed therein the original mounting glass table 1 and the reading unit 2, and besides these, a rail 12 as a rail member for guiding the running of the reading unit 2, a control board, a power source, etc.

Spacers 21 made of a material of high slidability such as POM are fixed to the opposite ends of the upper surface of the reading unit 2 in the main scanning direction thereof.

Also, a support shaft 2*a* in the unit 2 is rotatably supported by an aperture portion 22*a* on a sensor holder (carriage) 22, and the unit 2 is upwardly biased with the support shaft 2*a* as the center of rotation by a spring 23 fixed onto the holder 22.

As the result, the spacers 21 contact with the back of the original mounting glass table 1, whereby the reading unit 2 scans the original while keeping the spacing between the surface of the original mounting glass table 1 and the light receiving surface of the image sensor constant.

Also, the sensor holder 22 has slider portions 22*b* and 22*c* as sliding portions sliding relative to the rail 12. These slider portions 22*b* and 22*c*, like the spacers 21, are made of a material such as POM.

Further, the sensor holder 22 has rotatably disposed thereon a transmitting mechanism for transmitting a driving force to the reading unit 2 and a pulse motor 31 which is a driving source, a gear train for decelerating the rotation thereof, a driving pulley 32 to which the rotation of the motor 31 is transmitted through the gear train, and an idle pulley 33.

The reading unit 2 is connected to a control board on the main body of the apparatus by a cable, not shown, and the exchange of the electric power, the driving signal and an image signal is executed.

A rail 12 for guiding the running of the reading unit 2 is fixedly placed in the frame 11.

Also, one end 13*a* of a driving wire 13 as a rope-like member is fixed to the reading terminating end side. The driving wire 13 is twined on the driving pulley 32 on the reading unit 13, and is further passed over the idle pulley 33, and thereafter is fixed to the reading starting end side of the frame 11 through a spring 14.

The driving wire 13 is passed over as described above, whereby the reading unit 2 receives a moment as indicated by arrow A, and thereby the slider portions 22*b* and 22*c* on the sensor holder 22 come into contact with the rail 12.

The operation of the image reading apparatus constructed as described above will now be described with reference to FIGS. 1 and 2.

The reading unit 2 usually stands by at its home position on the reading starting end side during the non-operation thereof. When it receives a reading command from a computer connected thereto, the reading unit 2 starts scanning by the rotation of the motor 31, scans a white reference plate provided between the home position and the original reading starting position of the apparatus and produces shading correction data, whereafter it effects the reading of the image on the original from the reading starting position.

Here, the rotation of the motor 31 is decelerated through the gear train and is transmitted to the driving pulley 32. Usually, the step angle of the motor 31, the reduction ratio of the gears and the outer diameter of the driving pulley are determined so that the reading unit 2 may be moved by an amount corresponding to one sub-scanning line for a plurality of driving pulses given to the motor 31.

When the motor 31 is rotated in a forward direction, the driving pulley 32 takes up the wire 13 with a result that the reading unit 2 is moved in the scanning direction.

Also, when the motor 31 is rotated in a reverse direction, the reading unit 2 is moved toward its home position.

As previously described, the reading unit 2 is always biased in the direction of arrow A due to the moment created by the tension applied to the wire 13, and the slider portions 22*b* and 22*c* contact with the rail 12, whereby the posture of the reading unit is maintained.

That is, such a force that there is no backlash between the rail 12 and the sliding portion of the reading unit 2 and the sliding portion constantly contacts with the rail 12 is working and therefore, it is avoided that during the interruption/resumption of reading, vibration occurs to the movement of the reading unit 2.

The above-mentioned moment can be minimized within a range in which the vibration of the reading unit 2 does not occur, by appropriately choosing the spacing B between the driving pulley 32 and the idle pulley 33 in the lengthwise direction of the reading unit.

Also, the space between one end portion 13*a* of the wire 13 and the pulley 32 is parallel to the rail 12 with a first spacing (first portion), the space between the other end 14 of the wire 13 and the pulley 33 is also parallel to the rail 12 with a second spacing (second portion), the space between the first portion and the second portion is non-parallel to the rail 12 (third portion).

The basic portion of the driving system in the first embodiment is designated such that with respect to the reading direction in which feeding accuracy is necessary, the reading unit 2 draws in the wire 13 having one end thereof fixed and is moved thereby.

Also, in the return direction, there is the possibility of more or less feeding irregularity occurring when the wire 13 is drawn in by the expansion and contraction thereof because the wire 13 is fixed to the apparatus through a tension spring, but feeding accuracy is not much required. Accordingly, the tension applied to the wire 13 may be small as compared with that in driving systems of other types.

As described above, in the present invention, the backlash between the bearings and the rail 12 which poses a problem when the bearing span of the reading unit 2 is short can be eliminated by the utilization of the tension applied to the wire 13. Accordingly, even if there is the interruption/resumption of the operation in the course of reading, a smoothly connected image can be obtained and the downsizing of the apparatus can be expedited.

Also, as compared with the prior art system, the necessary driving load can be greatly reduced, and load sources heretofore individually required can be thrown into one and therefore, a reduction in consumed electric power becomes possible.

Further, the reading unit 2 and the optical system are arranged very compactly, and this brings about the downsizing of the apparatus.

Second Embodiment

A second embodiment is one in which the function of the spring for biasing the reading unit 2 toward the original mounting glass table 1 used in the first embodiment is also given to the tension applied to the driving wire 13, and brings about the effect of further decreasing the driving load.

Figure 3A:
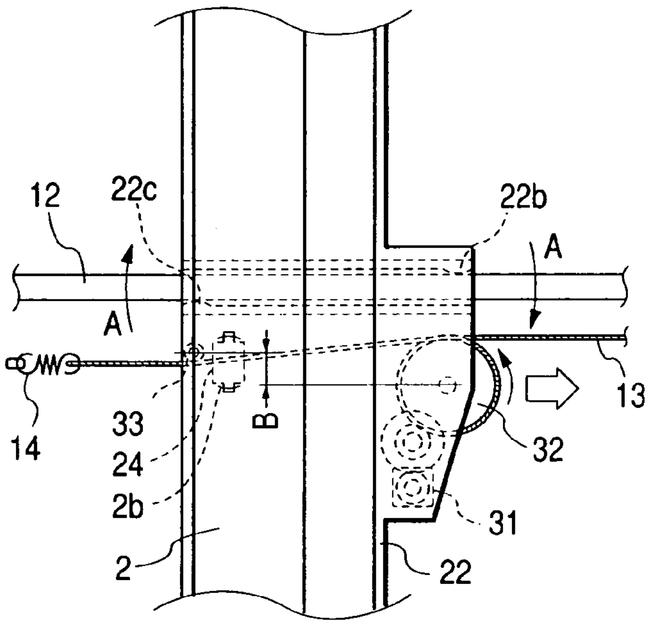
FIGS. 3A, 3B and 3C are enlarged views showing an image reading apparatus according to a second embodiment of the present invention.
Figure 3B:
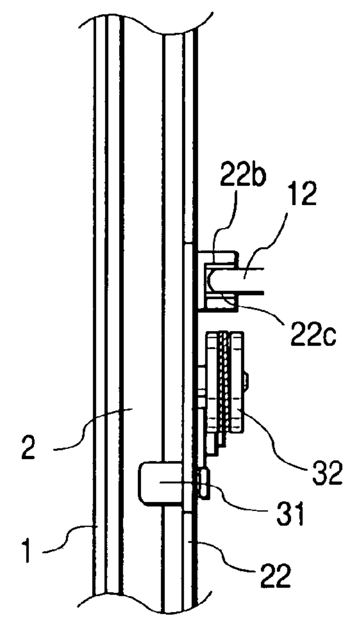
Figure 3C:
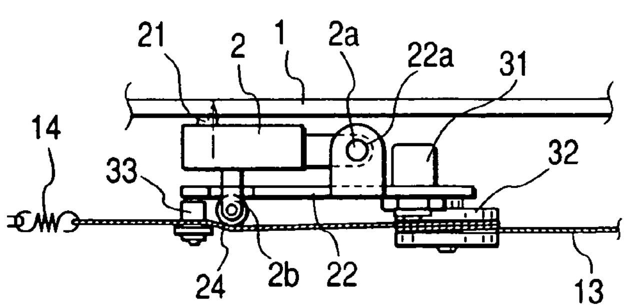

The second embodiment will hereinafter be described with reference to FIGS. 3A to 3C. In FIGS. 3A to 3C, portions designated by the same reference numerals as those in the first embodiment are similar in construction and function'to them.

A bearing portion 2*b* is provided on the back of the reading unit 2 in the second embodiment, and instead of the spring 23 in the first embodiment, a rotatable roller 24 is mounted thereon.

The roller 24 is disposed in the route of the driving wire 13, and is vertically in such a position that it depresses the driving wire 13 when the original mounting glass table 1 is mounted on the apparatus. Thus, the reading unit 2 is biased toward the original mounting glass table 1 by the tension of the driving wire 13 through the roller 24.

An appropriate biasing force is obtained by suitably choosing the size of the roller 24.

As in the first embodiment, the reading unit 2 is maintained in such a posture that the spacing between the surface of the original mounting glass table 1 and the light receiving surface of the image sensor becomes constant by the spacers 21.

According to the present construction, a similar effect can be obtained by a construction simpler than that of the first embodiment, accordingly in a form more simplified in assembly.

Third Embodiment

A third embodiment intends to further reduce the driving load by eliminating the frictional load of the slider portions 22*b* and 22*c* with the rail 12.

Figure 4A:
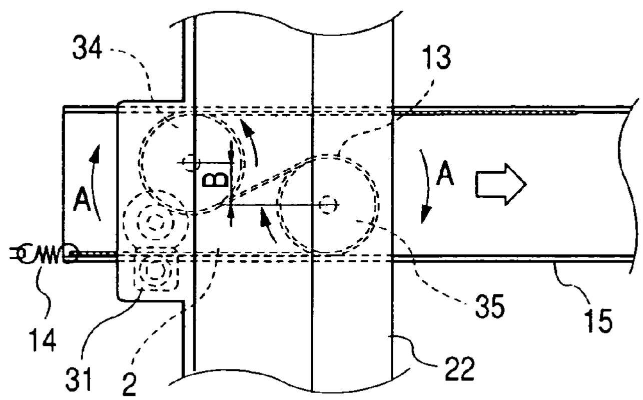
FIGS. 4A, 4B and 4C are enlarged views showing an image reading apparatus according to a third embodiment of the present invention.
Figure 4B:
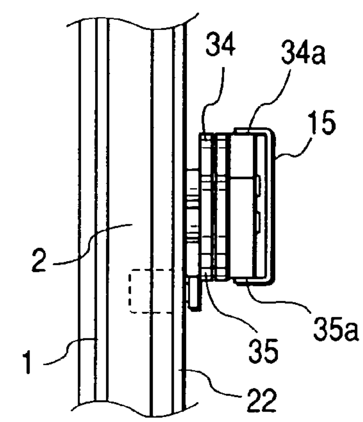
Figure 4C:
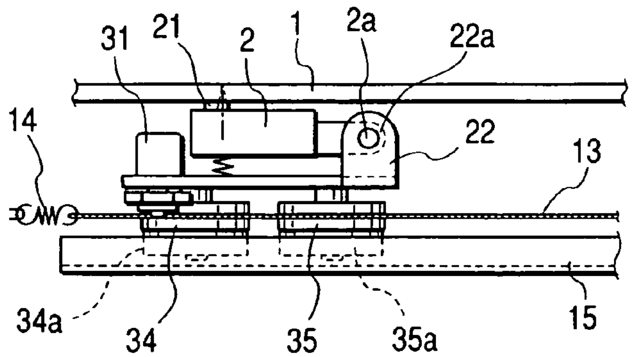
Figure 5A:
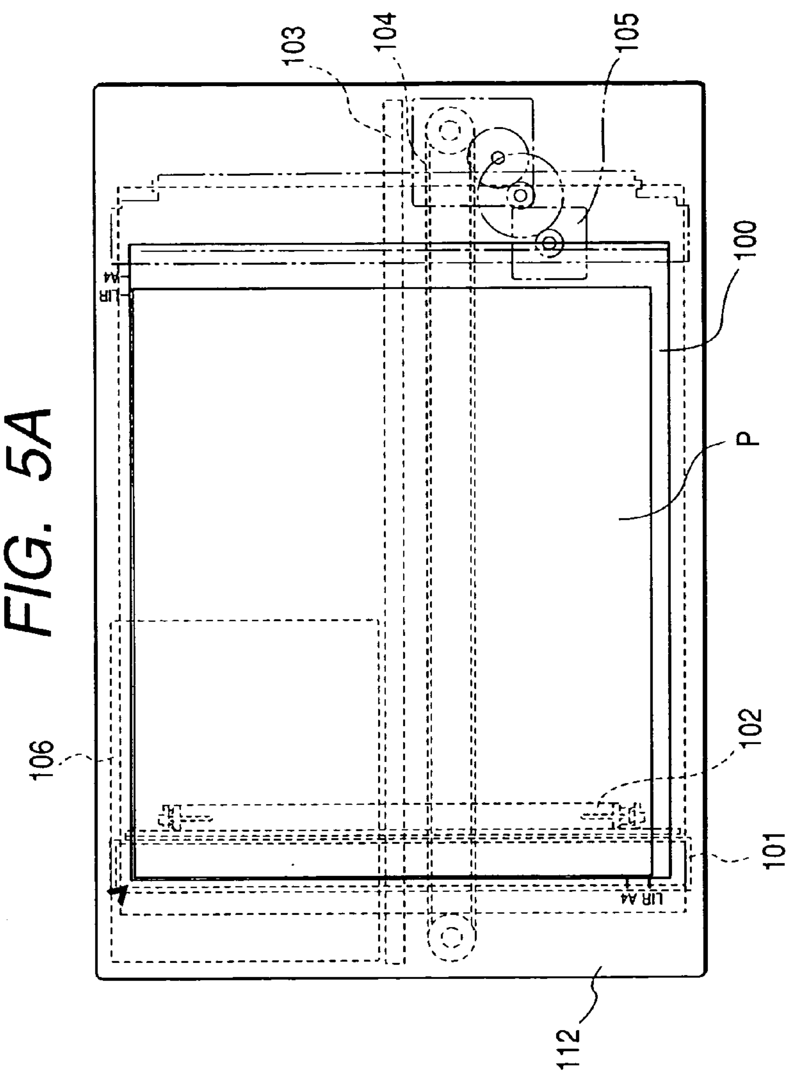
FIGS. 5A, 5B and 5C schematically show the construction of an image reading apparatus according to the prior art.
Figure 5B:
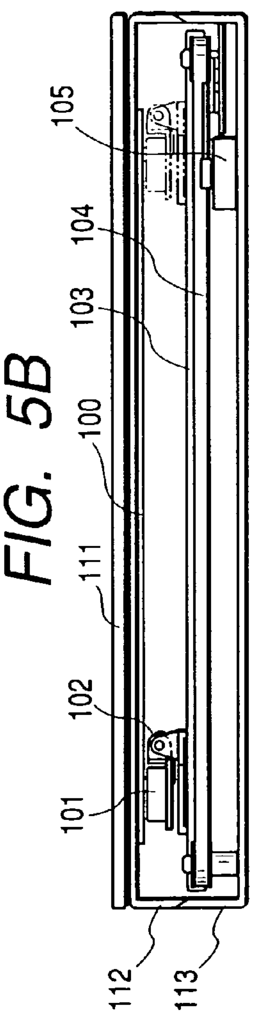
Figure 5C:
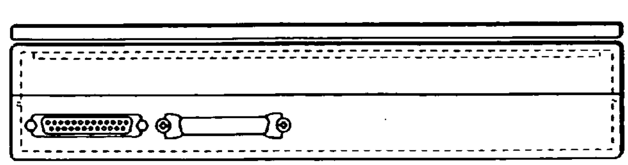
Figure 6:
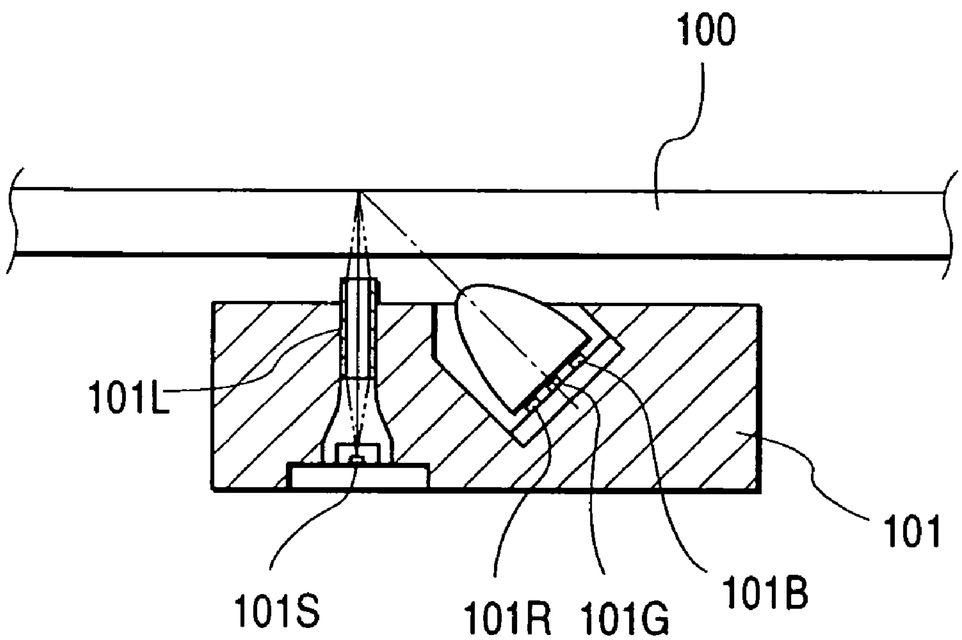
FIG. 6 schematically shows the construction of a reading unit.
Figure 7:
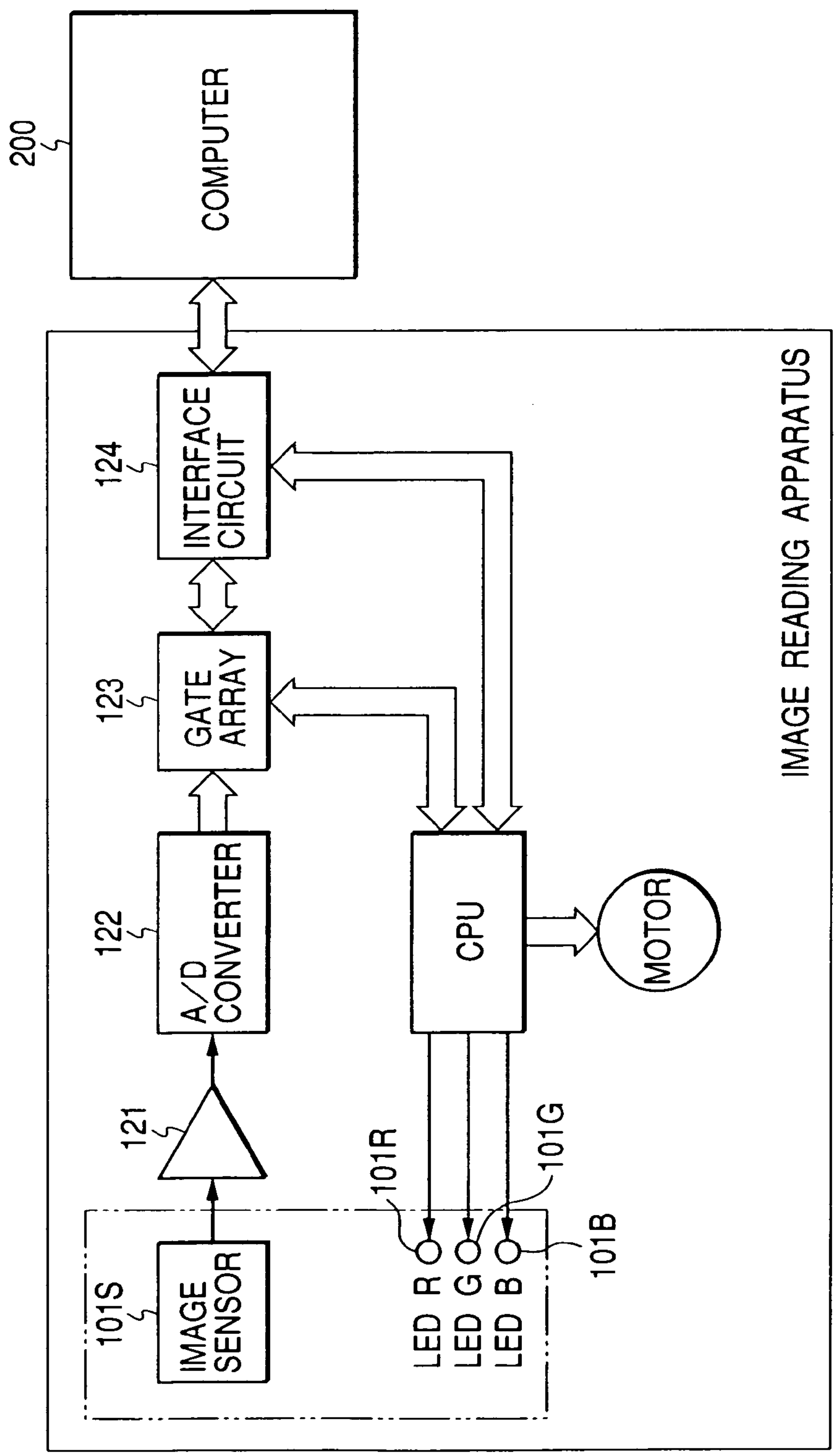
FIG. 7 is a read image data processing block diagram showing the image reading apparatus.

The third embodiment will hereinafter be described with reference to FIGS. 4A to 4C. In FIGS. 4A to 4C, portions designated by the same reference numerals as those in the first embodiment are similar in construction and function to them.

A transmitting mechanism for transmitting a driving force to the reading unit 2, a pulse motor 31 which is a driving source, a gear train for decelerating the rotation thereof, a driving pulley 34 to which the rotation of the motor 31 is transmitted through the gear train, and an idle pulley 35 are rotatably disposed on the sensor holder 22 in the third embodiment.

A U-shaped rail 15 for guiding the running of the reading unit 2 is fixed to and mounted in the frame 11.

Also, one end 13*a* of the driving wire 13 is fixed to the reading terminated end side. The driving wire 13 is twined on the driving pulley 34 on the reading unit 2, and is further passed over an idle pulley 35, and thereafter is fixed to the reading starting end side of the apparatus frame 11 through a spring 14.

The driving pulley 34 and the idle pulley 35 have cylindrical surfaces 34*a* and 35*a* as rotary members of the same diameter as the pitch circle diameter thereof (the diameter of the wire at the central position thereof) on the same shaft, and those cylindrical surfaces abut against the inner surface of the rail 15 by a moment created by tension being applied to the wire 13.

In the reading operation, the reading unit 2 is always biased in the direction of arrow A by a moment created by the tension of the wire 13 applied to the driving pulley 34 and the idle pulley 35, and a posture in which the respective cylindrical surfaces are in contact with the inner surface of the rail 15 is maintained.

That is, there is no backlash between the rail 15 and the sliding portion of the reading unit 2 and such a force that the reading unit constantly contacts with the rail 15 is working and therefore, it is avoided that during the interruption/resumption of reading, vibration occurs to the movement of the reading unit 2.

Also, the diameters of the cylindrical portions of the driving pulley 34 and the idle pulley 35 which contact with the rail 15 are equal to the pitch circle diameters of the pulleys 34 and 35.

Accordingly, the peripheral speed given to the pulleys 34 and 35 by the wire 13 is equal to the peripheral speed at which the pulleys 34 and 35 roll on the rail 15. That is, the pulleys 34 and 35 do not slide but roll on the rail 15, and no frictional force is produced between the pulleys and the rail 15 and therefore, as compared with the sliding bearing heretofore used, the force necessary for driving can be decreased.

The above-mentioned moment can be minimized within a range in which the vibration of the reading unit 2 does not occur, by appropriately choosing the spacing 13 between the driving pulley 34 and the idle pulley 35 in the lengthwise direction of the reading unit.

While in the embodiments described hitherto, the driving wire is used as a rope-like member, the present invention can likewise be carried out in a driving system using a timing belt.

Also, the biasing utilizing the tension of the rope-like member is not restricted to the elimination of the backlash of the reading unit 2 and the biasing thereof toward the original mounting glass table 1, and can be applied to the absorption of any backlash and vibration occurring during scanning drive, irrespective of the type of the reading unit 2.

As described above, the present invention can prevent the fitting backlash between the image reading means and the rail member, and can further prevent vibration from occurring to the movement of the image reading means. Accordingly, even if the interruption/resumption of the operation occurs in the course of reading, a smoothly connected image can be obtained and the downsizing of the apparatus can be expedited.

Also, the driving load necessary for the driving of the image reading means can be greatly reduced as compared with the prior-art system and therefore, consumed electric power can be made small.

The present invention is not restricted to the above-described embodiments, but covers all modifications within the technical idea thereof.

What is claimed is:

1. An image reading apparatus comprising:

an original mounting table;

an image sensor for reading an original mounted on said original mounting table;

a carriage having said image sensor mounted thereon for movement to scan the original;

a driving member, arranged to transmit a moving force to said carriage;

a guide member for guiding said carriage in the movement direction thereof, wherein said carriage is biased in a rotating direction centering about an axis perpendicular to said original mounting table by tension of said driving member; and a driving source mounted on said carriage for driving said carriage, a driving pulley mounted on said carriage for transmitting a driving force from said driving source to said driving member, and an idler pulley mounted on said carriage for biasing said driving member, and wherein said carriage is moved by a reaction force received from said driving member, wherein said driving member has a first portion extending parallel to said guide member and in which the spacing between it and said guide member is a first length, a second portion extending parallel to said guide member and in which the spacing between it and said guide member is a second length, and a third portion which is the portion between the first portion and the second portion, and extending non-parallel to said guide member.

2. An image reading apparatus according to claim 1, wherein said carriage has two sliders sliding with said guide member, and both of said sliders are biased toward said guide member by the tension of said driving member.

3. An image reading apparatus according to claim 1, wherein said carriage is further biased toward said original mounting table by the tension of said driving member.

4. An image reading apparatus according to claim 1, wherein said guide member has a U-shaped cross-section, rotary members are coaxially provided on said driving pulley and said idler pulley, and said two rotary members abut against the inner surface of said U-shaped guide member.

5. An image reading apparatus according to claim 1, wherein the driving member comprises a cable or a belt.

* * * * *